United States Patent [19]
Hanger

[11] 3,956,628
[45] May 11, 1976

[54] LIGHT SENSITIVE DETECTION SYSTEM

[75] Inventor: William A. Hanger, Churchville, Va.

[73] Assignee: General Electric Company, Waynesboro, Va.

[22] Filed: Dec. 20, 1974

[21] Appl. No.: 534,597

[52] U.S. Cl. .............................. 250/205; 250/232; 250/555
[51] Int. Cl.² ........................................ G01J 1/32
[58] Field of Search ........... 250/205, 232, 233, 552, 250/555, 568, 231 SE, 206; 356/141, 167

[56] References Cited
UNITED STATES PATENTS

| 3,293,980 | 12/1966 | De Benedetti | 356/141 X |
|---|---|---|---|
| 3,403,259 | 9/1968 | Lund | 250/205 |
| 3,473,084 | 10/1969 | Dodge | 250/205 X |
| 3,631,250 | 12/1971 | Van Buskirk | 250/552 X |
| 3,725,665 | 4/1973 | Talmo | 250/233 |
| 3,755,687 | 8/1973 | Garnett | 250/205 X |

Primary Examiner—Walter Stolwein
Attorney, Agent, or Firm—Michael Masnik

[57] ABSTRACT

A photoelectric detection system for a printer that is particularly useful for accurately detecting the position of type bearing or printing elements of known width and spacing as they pass a predetermined location. An output signal is generated that substantially corresponds to the light and dark periods created as the elements pass between a light source and detector. This output signal is integrated and compared with a reference signal that represents the ratio of the width of the elements to the spacing therebetween and the error is used to modify the light source and thereby adjust the output signal to accurately correspond with the dimensional criteria of the elements.

20 Claims, 3 Drawing Figures

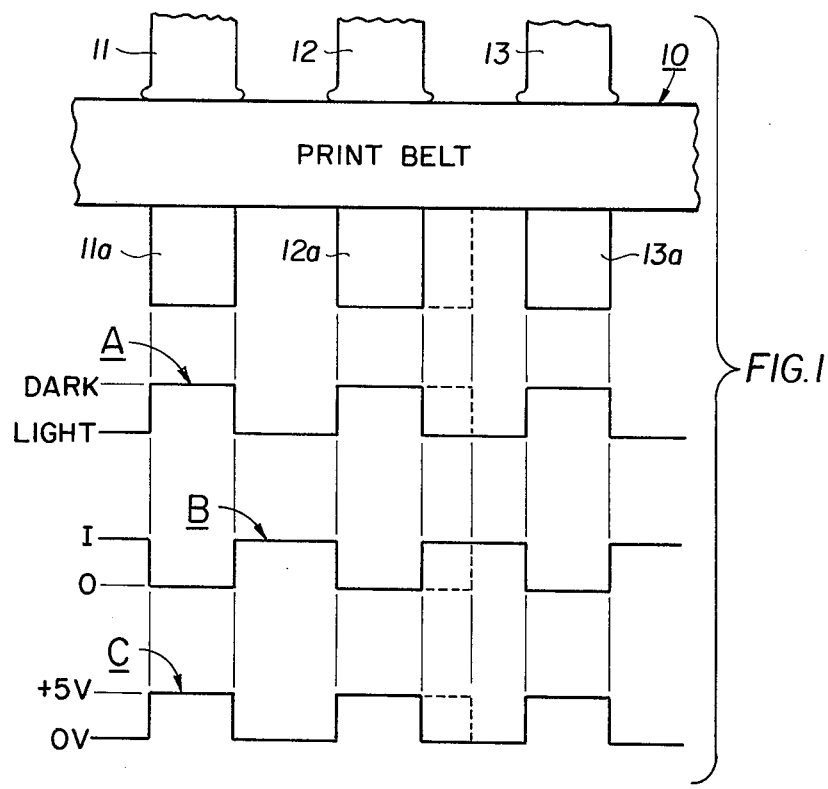
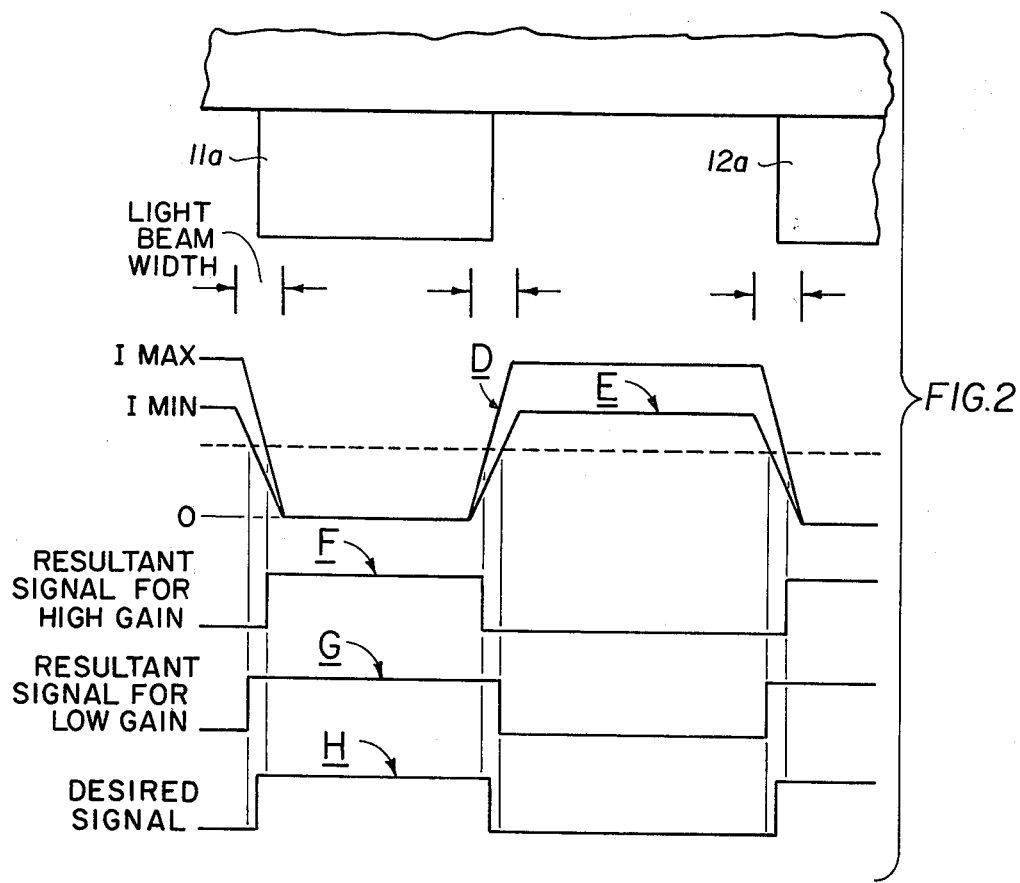

LIGHT SENSITIVE DETECTION SYSTEM

FIELD OF THE INVENTION

The present invention relates to a photoelectric signal generating circuit, more particularly to such a circuit for use in connection with high speed printing devices.

BACKGROUND OF THE INVENTION

High speed data transmission has resulted in the development of a number of types of printing devices that can accept input data at a high rate. U.S. Pat. No. 3,803,558, which is assigned to the same assignee as this invention, discloses one such system wherein the printing apparatus utilizes a continuously moving character belt that carries the type faces for each character to be printed. A plurality of hammers are arranged in a row across the face of a record medium such as paper, the position of each hammer establishing a column in which a character may be printed. Typically, an inking ribbon is positioned in front of the record medium and the path of the character belt is located behind the inking ribbon and in front of the hammers.

It is essential that the printer be capable of printing any desired character in any position across the record medium. Accordingly, means are provided for discretely indicating to control circuitry, where each character appears relative to the record medium. When this is established, circuitry is provided for energizing the hammers at an appropriate position to imprint the desired characters.

As disclosed in the aforecited patent, a typical character belt carries a number of flexible fingers, each of which has the type face for a particular character on one end thereof. The type carrying belt is mounted upon drive devices which rotate about parallel axes in order to effect passage of the fingers between the recording medium and hammers. The position of each character relative to a fixed point on the printer, is determined by detecting the passage of the flexible fingers past this fixed point. Generally, photoelectric means are positioned to effect this detection and generate a representative electric signal. The essence of the present invention is to establish accurately the position of each type finger relative to the hammers and record medium.

SUMMARY OF THE INVENTION

It is necessary to sense the position of the type fingers at precisely the right location with respect to the hammers, so as to subsequently strike the finger at the desired location within a column. Unfortunately, in the usual photoelectric pickup arrangement the light beam is of finite width and for this reason it is impossible to establish accurately the position of the type fingers. This problem is further aggravated by undesirable differences or changes in the operation of the light beam source and the pickup arrangement.

It is an object of the present invention to provide an improved type finger location sensor in a printer.

It is another object of the present invention to provide improved control circuitry for use with belt type line-at-a-time printers.

It is yet another object of the invention to provide an improved photoelectric detection circuit operative to accurately establish the position of type fingers on belt type high speed printers.

In accordance with the present invention there is provided a control circuit operative to produce output signals corresponding to the position of type fingers. This circuit includes feedback means whereby one is able to introduce a reference signal corresponding to the known dimensional criteria of the fingers on any belt. This known dimensional criteria is compared with the output of the photoelectric device and used to correct it in the event that errors are encountered.

A complete understanding of the invention and a fuller appreciation of its objects and features will be available from the following detailed description which is made in conjunction with the drawings of a particular illustrative embodiment.

BRIEF DESCRIPTION OF THE DRAWINGS

FIG. 1 illustrates a short segment of a type carrying belt of the type contemplated by this invention. Below the representative fingers of this belt, three waveforms are presented in order to illustrate the output signals generated by an idealized photoelectric pickup system;

FIG. 2 illustrates an enlarged portion of a type carrying belt of the type contemplated by this invention, and a plurality of waveforms representing the signals generated by existing photoelectric pickup means.

DESCRIPTION OF THE PREFERRED EMBODIMENT

Figure 3:
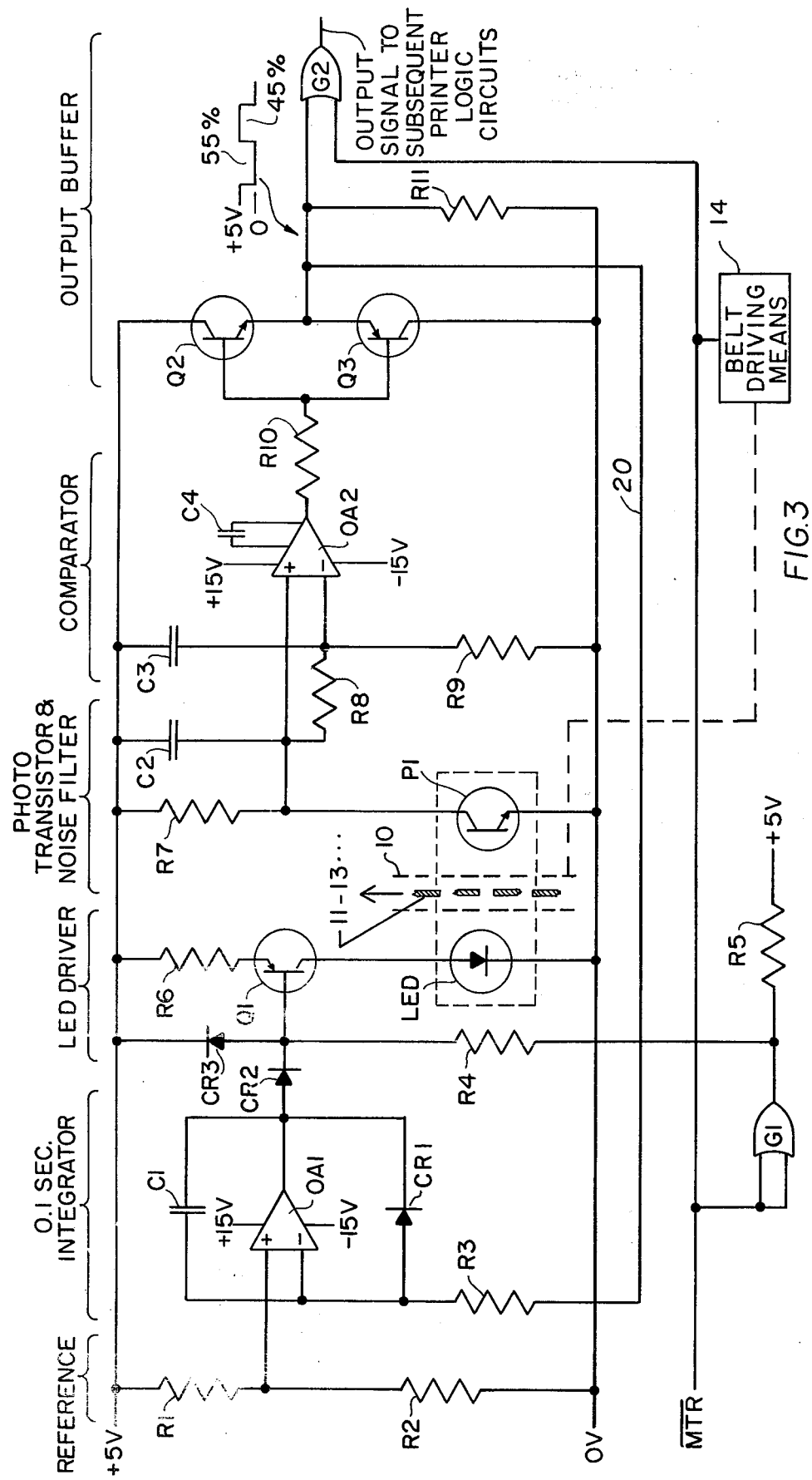
FIG. 3 is a circuit schematic showing circuitry for carrying out a particular embodiment of the invention.

FIG. 1 illustrates a short segment of a type carrying belt 10 containing three fingers 11, 12 and 13. The lower portions of these fingers are illustrated at 11A, 12A, and 13A respectively. These lower portions act to intercept the light path of a photoelectric pickup means. Typical dimensions for such fingers are 0.090 of an inch. In contrast, the space between such fingers is typically 0.110 of an inch. Accordingly, as such a belt traverses a path between the photoelectric pickup means, the portions 11A, 12A, 13A intercept the light path for a period of time slightly less than the period during which they are absent.

Waveform A of FIG. 1 is juxtaposed with the illustrated belt segment to show the light and dark periods created as a light beam is interrupted by the fingers of a moving belt. It will be appreciated that the ratio of light to dark periods, if one were able to employ a light beam of infinitesimal width, would be 0.090:0.110, or 45:55. In other words, the "light period" fills 45% of a cycle and the "dark period" fills the remaining 55% of the cycle.

Waveform B of FIG. 1 illustrates electric current as an analog of the light and dark periods. This waveform is also juxtaposed against the physical structure of the typical belt segment. The current may be generated by a photo transistor.

Waveform C is a voltage waveform illustrating a desired output signal of exact voltage magnitude and duration. This signal accurately represents the positioning of each type finger as it moves across the record medium.

Each Figure also includes a dashed outline representing the typical wide finger that is used to designate a change of font on the belt. Typically, such a wider finger might have a dimension of 0.135 of an inch. This being the case, the dark portion of a cycle created by the presence of such a wide finger can be considered to generate a signal occupying 67.5% of a total cycle, as compared to the 45% duration normally created by the standard type fingers.

FIG. 2 demonstrates the problem that is solved with this invention. Because it is physically impossible to sense the finger positions with a light beam of infinitesimal width, various signal conditions occur in the average photoelectric pickup circuit. The upper portion of FIG. 2 is an enlarged version of the type carrying belt segment shown in FIG. 1. As illustrated, a typical light beam is depicted, having a width of approximately 0.020 of an inch.

Detecting the position of a type finger with such a beam width results in the generation of current waveforms D and E. Waveform D represents a maximum current signal and waveform E represents a minimum current signal. The variations in these signals are caused by the various gains in the pickup circuitry. Typically, a threshold comparator is employed to achieve shaping of the output to a two state waveform and the dashed horizontal line illustrates the threshold of such a comparator. It is to be noted that there is a variation in the positions along the time axis abscissa at which the waveforms cross the axis.

Waveforms F and G illustrate the electric output signal that is generated as the output in either the high gain or low gain situations, respectively. In the former case, it is clear that the light interval is less than 45% of the complete cycle and in the latter case, it is clear that the light interval is more than 45% of the complete cycle. A proper signal exhibiting the desired durations, is shown in bottom waveform H.

The circuitry of the present invention is designed to generate a signal having the characteristics of waveform H in FIG. 2. As explained above, it is known that the output signal should have a time-ratio that is the same percent as the time-ratio of the light and dark spaces between centers of the type fingers as they pass the light beam. If this time-ratio is not correct the circuit described hereinafter automatically, via a feedback regulator, adjusts the light level from a light emitting diode in order to compensate and provide an output signal of the desired proportions. As a result, the edge of the print belt finger will be sensed accurately at its proper position along the path of travel.

The circuit schematic of FIG. 3 includes a number of functional headings disposed across the upper portion thereof. As suggested by these functional headings, the unit includes the light emitting diode portion, a belt 10, shown in dotted line to indicate its position out of the light path between the LED and P1, carrying spaced apart type fingers 11, 12, 13, etc., which are moved in the direction of the arrow by belt driving means 14 to interrupt the light path, a photo transistor P1 and noise filter portion R7, C2 responsive to the output from the light emitting diode, a comparator supplied by the photo transistor, and an output stage for developing the desired signals. A portion of the output is fed back to an integrator circuit which compares this output with a reference value and corrects the drive of the light emitting diode in order to assure that the output signal has the correct time-ratio.

The circuitry of FIG. 3 is presented in general form and will be described so that those skilled in the art can fully comprehend its operation. As further assistance, the following specific values for the various circuit components are presented. The dimensioning of resistors is in ohms and capacitors in microfarad or picofarad as shown. It is to be understood that these circuit values are included for convenience and assistance in understanding the invention only. They should not be construed to limit the invention and it is not suggested that these elements may not be varied within the scope and spirit of the invention. Each element is set forth with appropriate units adjacent to the element designations.

| R1 | — 221K | R2 | — 178K | R3 | — 100K |
|---|---|---|---|---|---|
| R4 | — 1K | R5 | — 1K | R6 | — 33 |
| R7 | — 10K | R8 | — 100K | R9 | — 4.7M |
| R10 | — 2.2K | R11 | — 5.6K | C1 | — 1.0mf |
| C2 | — 0.001mf | C3 | — 1.0mf | C4 | — 1.5pf |

The light emitting diode LED appearing in the center of the circuit schematic will be understood to generate light which is radiated through the type fingers into contact with the photo transistor P1. Thus, the input signal to this circuitry is developed at phototransistor P1 as the light impinges thereon. Resistor R7 and capacitor C2 provide a high frequency noise filter for the input signal as it is applied to a voltage comparator in the form of operational amplifier OA2. The entire circuit is generally energized between a 0 volt and +5 volt DC supply line. The only additional supply voltage is that illustrated for powering the operational amplifiers OA1 and OA2. The voltage developed at the junction between photo transistor P1 and resistor R7 is applied to one input of comparator OA2. Resistors R8 and R9, and capacitor C3 establish the reference for the comparator at a voltage that is essentially the average of the voltage across R7. This biasing technique allows for leakage in the photo transistor, for steady state light ambient reducing the cutoff current of the photo transistor, and for lack of full saturation of the photo transistor under full light from the light emitting diode LED.

Output amplifiers are provided in the form of transistors Q2 and Q3. These transistors are operated in fast-switching form by the output of comparator OA2 which is connected via resistor R10 to the base of each transistor. These transistors are selected to exhibit extremely low collector-to-emitter saturation voltages when they are conducting. The output, taken between the common emitter junction of transistors Q2 and Q3 and ground, is accordingly a square wave swinging 0 and +5 volts. Clearly, this output voltage has the nominal time-ratio of the light and dark periods of the type carrying belt as detected by the photo transistor through the apertures to the light emitting diode LED.

Because the nominal time-ratio will necessarily be imprecise, a feedback connection is provided over line 20 and via resistor R3 to one input of an integrating operational amplifier OA1. The integrator circuit comprising operational amplifier OA1, capacitor C1, and resistor R3, operates to average the output signal and compare the time average with a reference voltage from a divider made up of resistors R1 and R2 which are connected between the supply buses. The divider is designed to give an output voltage which is 45% of +5 volts; this value being selected because of the 45% time-ratio of the output signal desired from transistors Q2, Q3.

In the event of any discrepancy between the reference voltage from the junction of resistors R1 and R2 and the average voltage from the output transistors Q2, Q3, the error value is amplified by operational amplifier OA1 and is supplied via diode CR2 to the base of transistor Q1. Transistor Q1 is directly connected in the biasing circuit of the light emitting diode; this bias being provided via diode CR2, resistor R4, transistor Q1, and resistor R6. Thus, the error signal generated at the output of operational amplifier OA1 is effective to force the correct time-ratio at the transistor Q2, Q3 output.

Although not essential, one may also provide that the circuitry will be disabled in the event that the belt drive motor is not operating. A particular way of doing this is shown by the inclusion of logic OR gates G1 and G2.

The input signal designated MTR may be provided in a logic 1 state when the belt driving means, such as a motor is not running and a logic 0 state when the motor is running. Having established this criteria, it will be seen that when the motor is not running the input signal MTR via OR gate G1 allows the light emitting diode LED to be powered down, thereby increasing the useful life thereof. The logic OR gate G2 inhibits spurious signals from the photoelectric circuitry from effecting subsequent equipment during idle periods. In addition, logic gate G2 serves as a buffer to separate the logic loads from the output of transistors Q2, Q3.

When the motor is first started, the output of operational amplifier OA1 is at the lowest limit allowed by diode CR1. For this reason, the current source created by transistor Q1 and resistor R6 will turn on the light emitting diode LED to its fullest extent. As the motor brings the type finger belt up to speed, and as the integrating operational amplifier OA1 begins to force the photoelectric system into regulation, this current source is modulated to a lower current level via diode CR2 which diverts the drive current from resistor R4 out of transistor Q1. Diode CR3 protects the reverse base-emitter voltage of transistor Q1 and also keeps the output voltage of operational amplifier OA1 from going too far out of range and therefore from requiring an extremely long recovery time. Normally the cutoff condition will never be encountered unless an extremely intense outside ambient light is chopped by the print belt and also enters the aperture and shines on the photo transistor. This possibility can be greatly minimized by physical design of the light emitting diode-photo transistor unit.

Several matters should be noted in reviewing the functioning of this circuitry. First, resistor R11 operates to equalize the load on transistors Q2 and Q3. This resistor causes the emitter current and, hence, the collector-to-emitter drops of the transistors to be substantially equal. Second, resistor divider formed by R8 and R9 assures that comparator OA2 has a positive output voltage when the motor is not running, causing the integrator OA1 to go to its minimum output level so that the light emitting diode LED will be turned completely on when the motor is first turned on. This assures that the regulating system will start properly.

Third, the time constants of the OA1, C1, R3 integrator and of the bias filters R8, R9, C3 should be selected to allow the longest average time commensurate with an appropriate settling time after starting the motor. One desires good averaging over the entire length of a belt and should therefore allow for integrating the time-ratio of all fingers while still sensing the instantaneous position of each individual finger. Fourth, as previously mentioned, it is to be expected that typical print belts will include a plurality of sets or fonts of type bearing fingers with said sets each being identified by a finger having a radiation blocking geometry substantially different from the remaining fingers. For example, several wide or slotted fingers may be provided for set or font identification purposes. This is of little consequence since their size change is slight and since there will be only a few on the belt. The net effect of such wider fingers will change the overall belt time-ratio by very little as compared to component tolerances and to allowable position sensing errors. Fifth, capacitor C4 is required for operational amplifier OA2 only because of the type of amplifier employed. Finally, the resistor R5 increases the pull-up capability of the logic gate G1 output so that transistor Q1 will turn off more completely when the motor is not running.

A detailed preferred embodiment of the invention has been shown and described. Specific circuit parameters have been provided as an aid in understanding and practicing the invention; however, the presentation of these parameters should not be considered to be limiting. Modifications will immediately be apparent to those skilled in the art and all such modifications coming within the spirit and scope of this disclosure, are intended to be covered by the appended claims.

What I claim as new and desire to secure by Letters Patent of the United States is:

1. A light sensitive detection system operative to detect the presence and absence of moving elements of known dimensions and spacing as they pass a predetermined position at a given rate, comprising: a source of light, light responsive means responsive to the light from said source to generate an electric output signal having on and off intervals corresponding to the presence and absence of light respectively, said elements being operative to periodically interrupt the path between said source of light and light responsive means, a source of a reference signal having a value representative of the known ratio between the dimension of said elements and the spacing therebetween, correction means for sampling and averaging said output signal and comparing said sample average signal with said reference signal to produce an error signal, and means responsive to said error signal for modifying the light from said source by the amount required to produce an output signal that accurately represents the known dimensions and spacing of said elements.

2. A light sensitive detection system as defined in claim 1, wherein said light responsive means includes a light responsive element operative to produce a signal when light impinges thereon, and means to produce a constant amplitude signal when the output of said light responsive element exceeds a predetermined level.

3. A light sensitive detection system as defined in claim 1, wherein said elements are type fingers equally spaced about the circumference of a belt, and said belt being positioned to interpose said fingers between said source of light and light responsive means.

4. A light sensitive detection system as defined in claim 1, wherein said light source includes a light emitting diode and said light responsive means includes a phototransistor.

5. A light sensitive detection system operative to detect the presence and absence of moving fingers of known width equally spaced about the circumference of a belt, as they pass a predetermined position, comprising: a source of light; a light responsive element responsive to the light from said source to produce a signal when light impinges thereon; said belt being positioned to interpose said fingers between said source of light and light responsive element; means for moving said belt at a given rate past said predetermined position to produce an output signal of varying amplitude representing the modulation of light by the moving fingers; reference means generating a signal representative of the known ratio between the width of said fingers and the spacing therebetween; integrating means for integrating said output signal, comparing means for comparing said integrated output signal with said reference signal to produce an error signal; and means responsive to said error signal for modifying the light from said source by the amount required to produce an output signal of constant amplitude but having an on-off ratio that is substantially identical to the ratio of the known dimensions of said finger width and spacing.

6. A light sensitive detection system as defined in claim 5, including means coupled to said means for moving for disabling said source of light when said means for moving the belt is not operating.

7. A light sensitive detection system as defined in claim 6, including means coupled to said means for moving for producing a continuous output signal when said means for moving the belt is not operating.

8. A detection system operative to detect the presence and absence of moving elements of known dimensions and spacing as they pass a predetermined position at a given rate, comprising: a source of radiation, radiation responsive means responsive to the intensity of radiation from said source to generate an electric output signal having on and off intervals corresponding to the presence and absence of radiation respectively, said elements being operative to periodically interrupt the path between said source of radiation and radiation responsive means, means for compensating for undesirable differences or changes in the operation of said radiation source and said radiation responsive means comprising a source of a reference signal having a value representative of the known ratio between the dimension of said elements and the spacing therebetween, correction means for sampling said output signal and comparing it with said reference signal to produce an error signal, and means responsive to said error signal for modifying the radiation from said source by the amount required to produce an output signal that accurately represents the known dimensions and spacing of said elements.

9. An arrangement according to claim 8 wherein said elements appear as a plurality of sets of elements, and said integrating means integrates said output signal over substantially one of said sets of elements.

10. An arrangement according to claim 9 wherein said elements include a reference element having a radiation blocking geometry substantially different from the remaining elements.

11. An arrangement according to claim 9 comprising means for moving said elements, means responsive to the start-up of said means for moving for presetting the intensity of said radiation source to a predetermined maximum level, and means for thereafter reducing the radiation from said source in response to said error signal.

12. A light sensitive system for delivering signals indicating the presence of moving elements of known dimension and spacing in which such elements move along a path controlling the passage of light flux between a light source and a light responsive transducer converting light variations to electrical signals comprising a power control circuit for governing the flow of power to said light source, a reference signal source providing a signal representative of the known ratio between the dimension of said elements and the spacing therebetween, a comparator having one input connected with said reference signal source and another input connected with the signal from said transducer, and means connecting the output of said comparator with said power control circuit.

13. A light sensitive system according to claim 12 wherein said connecting means applies the output of said comparator to said power control circuit as a negative feedback signal.

14. A light sensitive system according to claim 12 wherein the polarity of operation of said comparator and said power control circuit is such as to produce a substantially constant amplitude output signal from said transducer when such signal has reached a predetermined level.

15. A light sensitive system according to claim 12 wherein said elements are type fingers uniformly spaced about the periphery of an endless closed loop carrier.

16. A light sensitive system according to claim 12 wherein an integrator is connected in the signal path between said light responsive device and said power control circuit.

17. A light sensitive system according to claim 12 further comprising means to reduce the power delivered to said light source when said elements are not moving.

18. A light sensitive system according to claim 12 wherein said elements are propelled by motive means, and a gate is provided in the signal output circuit, one input of said gate being connected with the output from said light responsive device and another input of said gate is connected with the power circuit for said motive means.

19. A light sensitive system according to claim 16 wherein said elements appear in a plurality of sets of elements and said integrator integrates said output signal over substantially one of said sets of elements.

20. A light sensitive system according to claim 19 wherein the time constant of said integrator is of the order of the time required for the passage of one complete set of elements.

* * * * *

UNITED STATES PATENT OFFICE
CERTIFICATE OF CORRECTION

Patent No. 3,956,628　　　　　　　　　　Dated May 11, 1976

Inventor(s)　　William A. Hanger

It is certified that error appears in the above-identified patent and that said Letters Patent are hereby corrected as shown below:

Column 5, line 13, cancel "MTR" and insert -- $\overline{\text{MTR}}$ --

Column 5, line 18, cancel "MTR" and insert -- $\overline{\text{MTR}}$ --

Signed and Sealed this

Twenty-first Day of June 1977

[SEAL]

Attest:

RUTH C. MASON
*Attesting Officer*

C. MARSHALL DANN
*Commissioner of Patents and Trademarks*